United States Patent
Pearson et al.

(10) Patent No.: US 10,264,261 B2
(45) Date of Patent: Apr. 16, 2019

(54) ENTROPY ENCODING INITIALIZATION FOR A BLOCK DEPENDENT UPON AN UNENCODED BLOCK

(71) Applicant: Integrated Device Technology, Inc., San Jose, CA (US)

(72) Inventors: Eric C. Pearson, Conestogo (CA); Pavel Novotny, Waterloo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 432 days.

(21) Appl. No.: 14/011,503

(22) Filed: Aug. 27, 2013

(65) Prior Publication Data

US 2015/0063449 A1 Mar. 5, 2015

(51) Int. Cl.
| | |
|---|---|
| H04N 19/13 | (2014.01) |
| H04N 19/91 | (2014.01) |
| H04N 19/176 | (2014.01) |
| H04N 19/194 | (2014.01) |
| H04N 19/436 | (2014.01) |
| H04N 19/147 | (2014.01) |
| H04N 19/174 | (2014.01) |

(52) U.S. Cl.
CPC .......... *H04N 19/13* (2014.11); *H04N 19/147* (2014.11); *H04N 19/174* (2014.11); *H04N 19/176* (2014.11); *H04N 19/194* (2014.11); *H04N 19/436* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 2008/0013633 A1* | 1/2008 | Ye | H04N 19/13 375/240.24 |
| 2008/0232706 A1 | 9/2008 | Lee et al. | |
| 2009/0175332 A1* | 7/2009 | Karczewicz | 375/240.03 |
| 2010/0284456 A1 | 11/2010 | Frank | |
| 2012/0281768 A1 | 11/2012 | Matsuba et al. | |
| 2013/0044806 A1* | 2/2013 | Huang | H03M 7/4006 375/240.02 |

(Continued)

OTHER PUBLICATIONS

Gordon, C. et al., "Wavefront Parallel Processing for HEVC Encoding and Decoding", Input Document to JCT-VC, Joint Collaborative Team on Video Coding (JCT-VC) of ITU-T SG16 WP3 and ISO/IEC JCT1/SC29/WG11, 6th Meeting: Torino, IT, Jul. 14-22, 2011, JCTVC-F274 (2011).*

(Continued)

*Primary Examiner* — William C Vaughn, Jr.
*Assistant Examiner* — Lindsay J Uhl
(74) *Attorney, Agent, or Firm* — Christopher P. Maiorana, PC

(57) ABSTRACT

Apparatuses and methods for initializing a CABAC state are disclosed herein. An example apparatus may include an encoder configured to receive a macroblock dependent on at least one unencoded macroblock. The encoder may further be configured to receive a plurality of CABAC states and initialize CABAC in accordance with one of the plurality of CABAC states to encode the macroblock prior to the at least one unencoded macroblock being encoded.

18 Claims, 10 Drawing Sheets

(56) References Cited

U.S. PATENT DOCUMENTS

| | | | |
|---|---|---|---|
| 2014/0355690 A1* | 12/2014 | Choi | H04N 19/176 375/240.24 |
| 2015/0023409 A1* | 1/2015 | Schierl | H04N 19/00951 375/240.02 |
| 2015/0341672 A1* | 11/2015 | Lee | H04N 19/91 375/240.12 |

OTHER PUBLICATIONS

Clare, G., et al., "Wavefront Parallel Processing for HEVC Encoding and Decoding", Joint Collaborative Team on Video Coding (JCT-VC) of ITU-T SG16 WP3 and ISO/IEC JTC1/SC29/WG11, 6th Meeting: Torino, IT, Jul. 14-22, 2011, Doc. JCTVC-F274 (2011) (Year: 2011).*

International Search Report and Written Opinion for PCT/US2014/047793 dated Nov. 6, 2014.

* cited by examiner

US 10,264,261 B2

ENTROPY ENCODING INITIALIZATION FOR A BLOCK DEPENDENT UPON AN UNENCODED BLOCK

TECHNICAL FIELD

Embodiments of this invention relate generally to video encoding, and examples of CABAC initialization are described herein.

BACKGROUND

Video signals may be used by a variety of devices, including televisions, broadcast systems, mobile devices, and both laptop and desktop computers. Typically, devices may display video in response to receipt of video signals, often after decoding the signal from an encoded bitstream. Video signals provided between devices are often encoded using one or more of a variety of encoding and/or compression techniques, and video signals are typically encoded in a manner to be decoded in accordance with a particular standard, such as H.264 and HEVC. By encoding video signals, then decoding the received signals, the amount of data transmitted between devices may be significantly reduced.

Video encoding is typically employed by encoding macroblocks, or other coding units, of video data. Predictive encoding may be used to generate predictive blocks and residual blocks, where the residual blocks represent a difference between a predictive block and the block being coded. Prediction coding may include spatial and/or temporal predictions to remove redundant data in video signals, thereby further increasing the reduction of data. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, syntax elements, such as coefficients and motion vectors, may be encoded using one of a variety of encoding techniques (e.g., entropy encoding), and several approaches may further attempt to optimize syntax elements. Many video encoding methodologies make use of some form of trade-off between an achievable data rate and the magnitude of distortion in a decoded signal. Encoding in this manner is often computationally demanding and poses significant challenges when applied in real-time applications. While in some instances, parallel processing may address relatively high computational demand, temporal and/or spatial dependencies existing between respective portions of a video signal may preclude use of conventional parallel processing approaches.

DETAILED DESCRIPTION

Examples of methods and apparatuses for initializing context-adaptive binary arithmetic coding (CABAC) are disclosed herein. In accordance with one or more described embodiments, macroblocks dependent on unencoded macroblocks may be encoded. For example, in accordance with some video encoding methodologies, the encoding of one macroblock may be dependent upon (e.g. may utilize values from) the encoding of other macroblocks, which may be in a certain spatial arrangement with the macroblock to be encoded. In examples described herein, the macroblock may be encoded even when other macroblocks on which the encoding depends have not yet themselves been encoded.

Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

Figure 1:
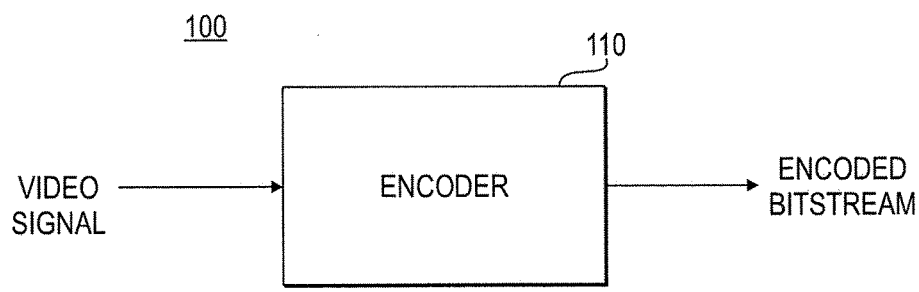
FIG. 1 is a block diagram of an apparatus according to an embodiment of the present invention.

FIG. 1 is a block diagram of an apparatus 100 according to an embodiment of the invention. The apparatus 100 may include an encoder 110. The encoder 110 may be configured to receive a signal, such as a video signal, that may represent video data (e.g., frames) and the encoder may encode the video signal to provide an encoded bitstream. The apparatus 100 may be implemented in any of a variety of devices employing video encoding, including but not limited to, televisions, broadcast systems, mobile devices, and both laptop and desktop computers. Generally, the encoder 110 may operate at a fixed rate to output a bitstream that may be generated in a rate-independent manner.

The encoder 110 may include one or more logic circuits, control logic, logic gates, processors, memory, and/or any combination or sub-combination of the same, and may be configured to encode and/or compress a video signal using one or more encoding techniques (e.g., H.264, HEVC), examples of which will be described further below. The encoder 110 may be configured, for example, to encode a variable bit rate signal and/or a constant bit rate signal. In at least one embodiment, the encoder 110 may include an entropy encoder, such as a CABAC encoder, and/or may be configured to encode data at the macroblock level. Each macroblock may be encoded in intra-coded mode, inter-coded mode, bidirectionally, or in any combination or sub-combination of the same.

In an example operation of the apparatus 100, the encoder 110 may receive and encode a video signal in accordance with one or more encoding techniques (e.g., H.264, HEVC) to provide an encoded bitstream. The encoded bitstream may be provided to external circuitry. In one embodiment, for instance, the encoder 110 may provide the encoded bitstream to a decoder, which may subsequently provide (e.g., generate) a video signal based, at least in part, on the encoded bitstream. The video signal provided to the encoder 110 may differ from the video signal provided by a decoder due to lossy encoding operations employed by the encoder 110, such as, quantization.

In some instances, the encoder 110 may be configured to encode a macroblock dependent (e.g. spatially dependent, temporally dependent, or both) on one or more unencoded macroblocks. The encoder 110 may, for instance, be configured to encode the first macroblock of a fragment (e.g., row) of a picture prior to encoding one or more other macroblocks on which encoding of the first macroblock depends. As will be explained in more detail below, to encode the first macroblock, the encoder 110 may initialize CABAC using one or more stored CABAC states.

Figure 2:
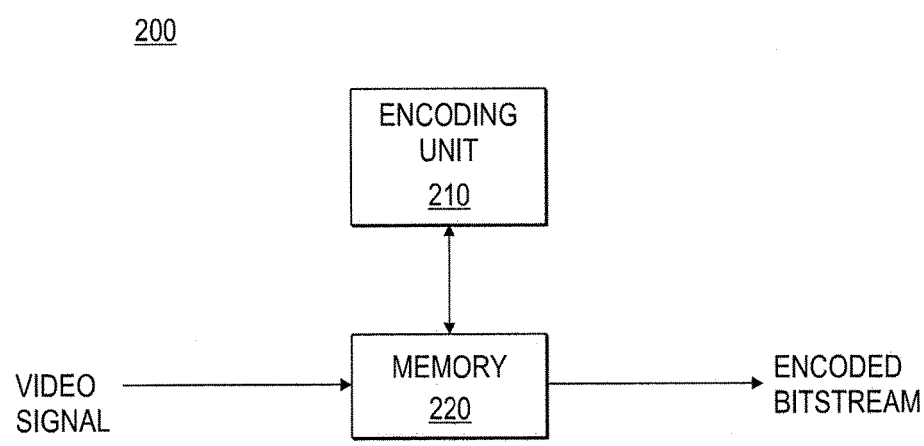
FIG. 2 is a block diagram of an encoder according to an embodiment of the present invention.

FIG. 2 is a block diagram of an encoder 200 according to an embodiment of the present invention. The encoder 200 may be used to implement the encoder 110 of FIG. 1, and may be configured to operate in accordance with one or more coding standards, such as H.264 and HEVC.

The encoder 200 may include an encoding unit 210 and a memory 220. The memory 220 may comprise one or more physical memories, and may comprise any suitable memory, including but not limited to, disk drives, optical drives, dynamic random access memory (DRAM), static random access memory (SRAM), phase change memory (PCM), NAND flash memory, NOR flash memory, or combinations thereof. The encoding unit 210 may be coupled to the memory 220 and may be configured to receive data from and provide data to the memory 220. For example, in at least one embodiment, the encoding unit 210 may be configured to receive a video signal from the memory 220 and encode the video signal to provide an encoded bitstream. The encoding unit 210 may be configured to provide the encoded bitstream to the memory 220.

In operation, the memory 220 may store a video signal. The encoding unit 210 may receive the video signal from the memory 220, encode the video signal at a macroblock level, for instance, as described with reference to FIG. 1, and provide an encoded bitstream to the memory 220. The encoded bitstream may subsequently be provided from the memory 220.

Figure 3:
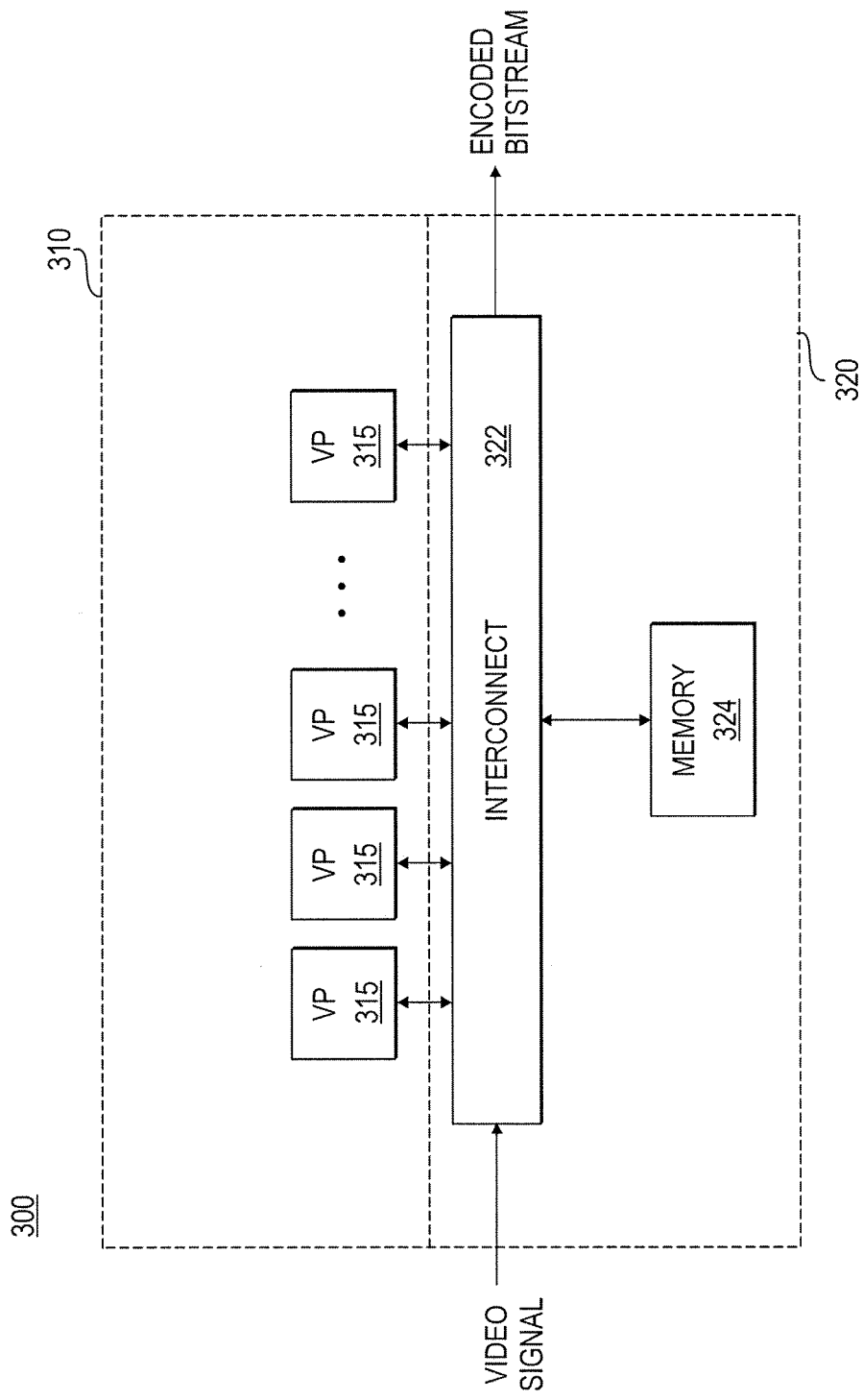
FIG. 3 is a block diagram of an encoder according to an embodiment of the present invention.

FIG. 3 is a block diagram of an encoder 300 according to an embodiment of the present invention. The encoder 300 may be used to implement the encoder 200 of FIG. 2, and may be configured to operate in accordance with one or more coding standards, such as H.264 and HEVC.

The encoder 300 may include an encoding unit 310 that may be used to implement the encoding unit 210 of FIG. 2 and may include a memory 320 that may be used to implement the memory 230 of FIG. 2. The encoding unit 310 may include processing elements 315 and the memory 320 may include an interconnect 322 and memory 324.

Memory 324 may be implemented using any memory, including but not limited to, dynamic random access memory (DRAM), static random access memory (SRAM), phase change memory (PCM), NAND flash memory, and NOR flash memory, or combinations thereof. The memory 324 may comprise a logical memory and/or may comprise a physical memory. For example, in at least one embodiment, the memory 324 may comprise a physical memory. In another embodiment, the memory 324 may comprise one or more physical memories divided into any number of logical memories. The interconnect 322 may be coupled to each of the processing elements 315 and the memory 324 and may be configured to provide data therebetween. The interconnect 322 may further be configured to receive a video signal and provide an encoded bitstream, as described.

Each of the processing elements 315 may be implemented using a video processor configured to process a video signal. Processing the video signal using the processing elements 315 may include filtering and/or encoding the video signal. Filtering employed by the processing elements 315 may include measuring one or more metrics of the video signal, including but not limited to, brightness, motion, rate, luminance activity, chrominance activity, sum of absolute differences between macroblocks, mean luminance values, and mean chrominance values, and further may include performing one or more operations on the video signal including, but not limited to, color space adjustment (e.g., RGB to YUV), interlacing, de-interlacing, scaling (e.g., upscaling, downscaling), noise filtering, and adjustment of subjective video signal characteristics (e.g., brightness, contrast). Encoding employed by the processing elements 315 may include employing any encoding technique known in the art, now or in the future, including but not limited to, field-based encoding techniques, frame-based encoding techniques, adaptive quantization encoding techniques, and rate-distortion optimization encoding techniques. Each encoding technique may be performed in accordance with any coding standard known in the art, including, but not limited to H.264 and HEVC.

In at least one embodiment, the processing elements 315 may be configured to operate in parallel. In this manner, respective subsets of the processing elements 315 may operate on different portions (e.g., macroblocks, pictures) of the video signal simultaneously. By way of example, a first processing element 315 may encode macroblocks of a first row of a picture while a second processing element 315 encodes macroblocks of a second row of a picture. Moreover, in some instances, a processing element 315 may be configured to process a same portion of a video signal simultaneously using different operations. For example, in at least one embodiment, a processing element 315 may be configured to field-encode and frame-encode a picture of a video signal concurrently.

Each of the processing elements 315 may be implemented in hardware, software, or combinations thereof. For example, in one embodiment, all of the processing elements 315 may be implemented in hardware, for example each may be implemented using a separate processor or processor core. In another embodiment, a first set of the processing elements 315 may be implemented in hardware and each of a second set of the processing elements 315 may comprise a virtual processor executing on a same hardware processor.

Figure 4:
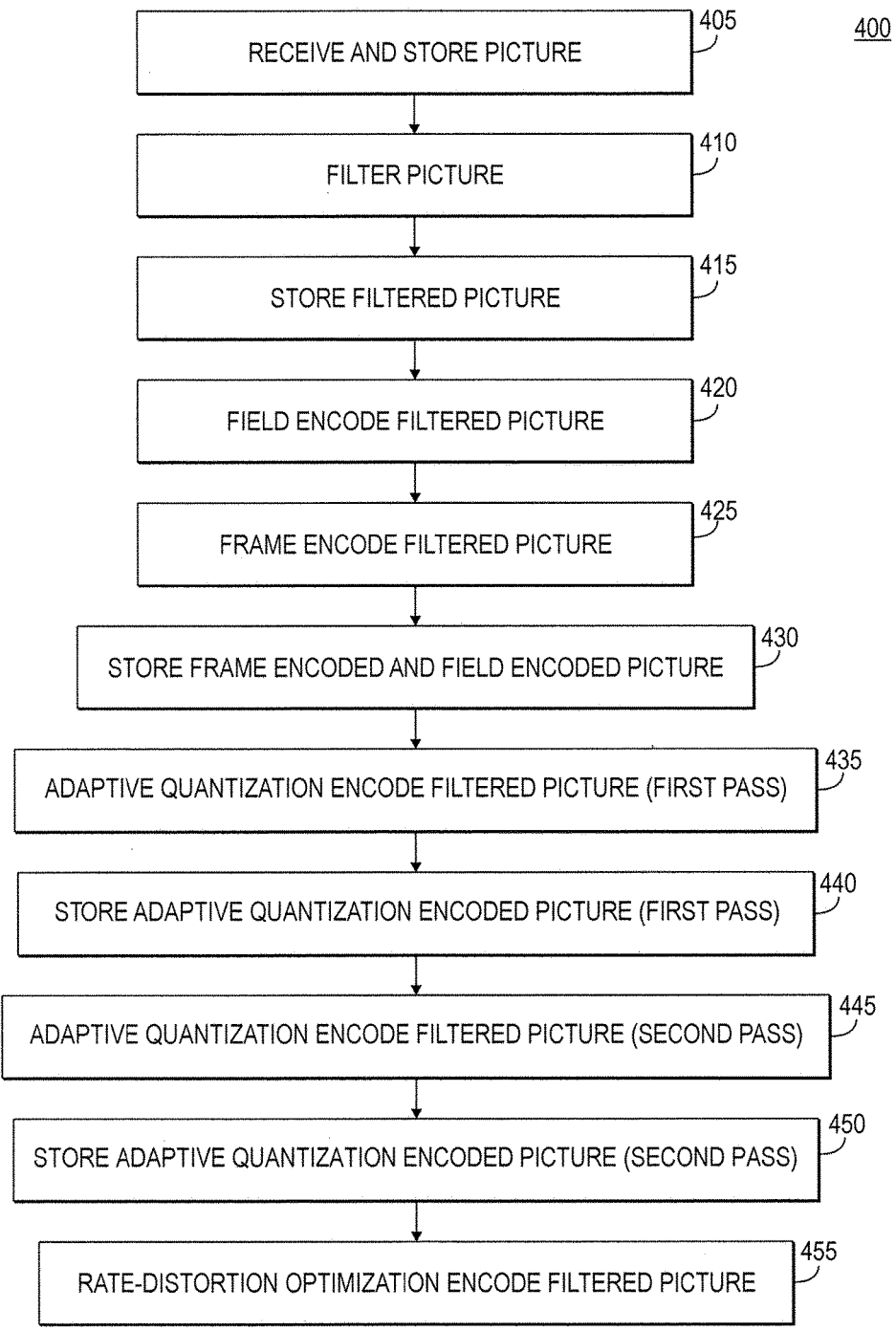
FIG. 4 is a flowchart of a method for encoding a video signal according to an embodiment of the present invention.

FIG. 4 is a flowchart of a method 400 for encoding a video signal according to an embodiment of the present invention. The method 400 may be implemented using the encoder 300 of FIG. 3.

The method 400 is described herein with respect to encoding a picture. It will be appreciated, however, that the method 400 may be performed at any coding unit level. In at least one embodiment, multiple iterations of the method 400 may be performed concurrently such that multiple pictures of a video signal may be encoded in a pipelined manner.

At a step 405, video signals corresponding to a picture may be received at the interconnect 322 and stored (e.g., buffered) in the memory 324. At a step 410, the picture may be filtered by one or more of the processing elements 315. As described, filtering the picture may include measuring various metrics of the picture and/or performing one or more operations on the picture. At a step 415, the filtered picture and/or data associated with the filtering process may be stored in the memory 324.

At a step 420, the filtered picture may be field encoded by one or more of the processing elements 315 to provide a field-encoded picture. Additionally, one or more CABAC states may be determined for each macroblock of the field-encoded picture. For example, a quantization parameter and associated rate and distortion costs may be calculated for each macroblock of the field-encoded picture. At step 425, the picture may also be frame encoded by one or more of the processing elements 315 to provide a frame-encoded picture. As with the field encode operation at step 420, one or more CABAC states may be determined for each macroblock of the frame-encoded picture. In at least one embodiment, steps 420 and 425 may be performed in an overlapping or concurrent manner. The field and frame encoded pictures and associated CABAC states may each be stored in the memory 324 at a step 430.

At a step 435, the filtered picture may be encoded by one or more of the processing elements 315 using a first pass of adaptive quantization (AQ) encoding to provide a first pass AQ encoded picture and associated CABAC states for each macroblock of the encoded picture. Generally, AQ encoding may reallocate bits designated for a picture to create a more even distribution of bits between macroblocks. In at least one embodiment, the AQ encoding may be employed based on the frame-encode of step 420 and/or the field-encode of step 425. For example, the AQ encoding may be employed using the respective CABAC states assigned to each of the macroblocks of the field encoded picture provided at step 420 and/or the respective CABAC states assigned to each of the macroblocks of the frame encoded picture provided at step 425. At a step 440, the first pass AQ encoded frame and associated CABAC states may be stored in the memory 324.

At a step 445, one or more of the processing elements 315 may encode the filtered picture using a second pass of AQ encoding to provide a second pass AQ encoded picture and associated CABAC states. In at least one embodiment, the AQ encoding may be employed using the frame-encode of step 420 and/or the field-encode of step 425. For example, the AQ encoding may encode the filtered picture using the respective CABAC states assigned to each of the macroblocks of the field encoded picture provided at step 420 and/or the respective CABAC states assigned to each of the macroblocks of the frame encoded picture provided at step 425. The AQ encoding may further be performed using the first pass of AQ encoding of step 435. For example, the AQ encoding may utilize the respective CABAC states assigned to teach of the macroblocks of the first pass AQ encoded picture. At a step 450, the second pass AQ encoded picture and associated CABAC states may be stored in the memory 324.

At a step 455, one or more of the processing units 315 may encode the filtered picture using rate-distortion optimization (RDO) encoding to provide an RDO encoded picture. Generally, RDO refers to a process designed to select a rate-distortion trade-off where a sufficient rate is maintained with an allowable amount of distortion. Rate-distortion optimization may typically be measured using "RD scores." Encoding methods typically aim to minimize RD scores, indicating an optimized rate-distortion trade-off.

In some examples, the RDO encoding of step 455 may be performed using one or more pre-encode operations, e.g., the field encoding, frame encoding, first pass AQ encoding and second pass AQ encoding operations of steps 420, 425, 435, and 445, respectively. For example, the RDO encode may be performed using the respective CABAC states assigned to each of the macroblocks in one or more of the pre-encode operations. By way of example, for each macroblock, the RDO encode may include determining a respective RD score for each CABAC state provided in each pre-encode operation. The CABAC state providing a minimized RD score for a macroblock may be selected and subsequently used for encoding.

Any number of processing units 315 may be used to perform each filtering operation and/or encoding operation. For example, in one embodiment, frame encoding and field encoding described at steps 420 and 425, respectively, may be performed by a same processing unit 315, e.g., using time division multiplexed processing. In another example, multiple processing units 315 may be used to filter a picture. In yet another example, a same processing unit 315 may be used to perform each AQ encode at steps 435 and 445, respectively.

While the method 400 is described as including steps 405-455, it will be appreciated that various steps of the method 400 may be omitted and/or additional steps may be added to the method 400 without departing from the scope and spirit of the invention. By way of example, in one embodiment, the step 410 may be omitted, and/or additional encoding steps (e.g., additional AQ encoding passes) may be included.

In at least one embodiment, processing units 315 may be configured to operate in parallel, for instance, while RDO encoding the filtered picture. Because RDO encoding may require relatively significant processing resources, RDO encoding a picture in parallel may allow operation in real-time.

Figure 5:
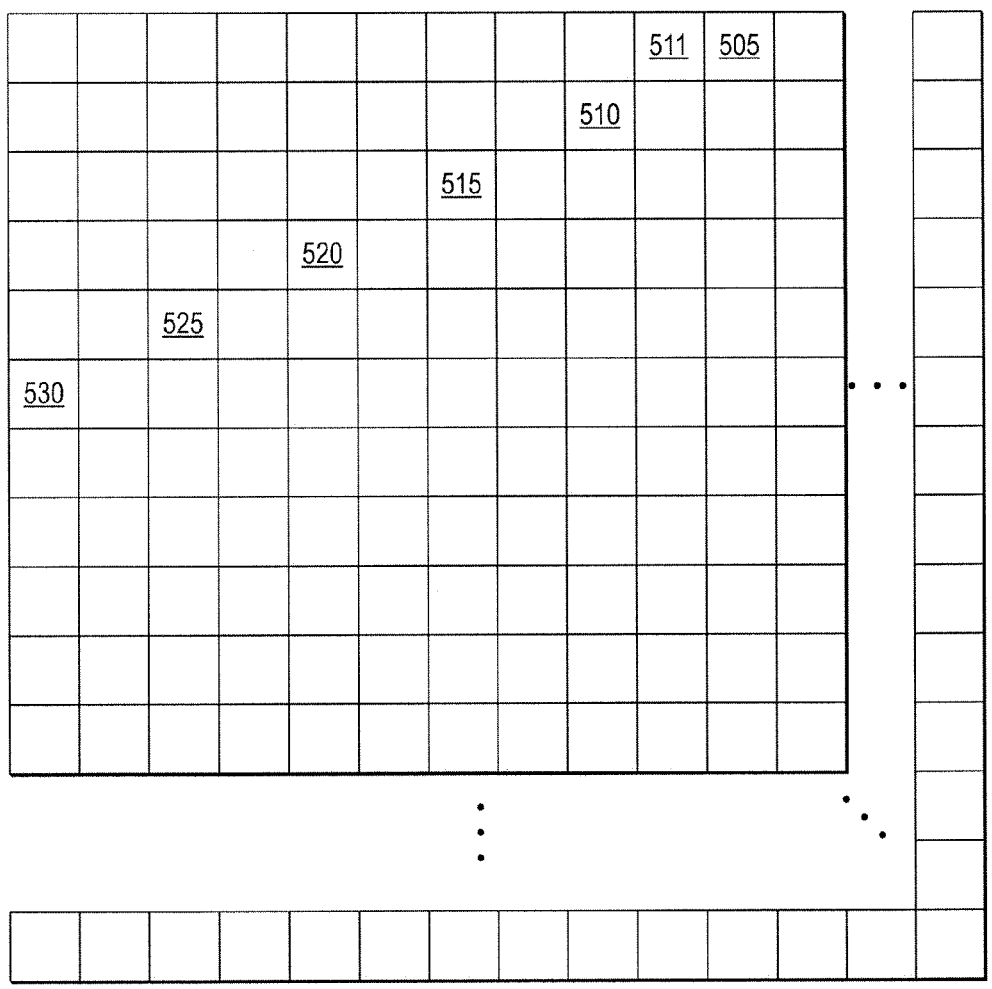
FIG. 5 is a schematic diagram of a picture according to an embodiment of the present invention.

Because macroblocks may have temporal and/or spatial dependencies on one or more other macroblocks, in some examples, processing units 315 may be configured to encode a picture using a spatial offset arrangement, or "wave front" encoding. By way of example, with reference to FIG. 5, a portion of a picture 500 including macroblocks 510, 515, 520, 525, and 530 may be encoded in parallel by N processing units 315. At a given time during an RDO encoding operation, macroblocks 505, 510, 515, 520, 525, and 530 may each be encoded by a respective processing unit 315. As illustrated, a spatial offset (e.g., 1 row, 2 columns) may be used to offset (e.g., stagger) the point at which each processing unit 315 is encoding a respective row at the given time relative to other processing units 315. In some instances, encoding of macroblocks, such as the macroblock 510, may depend on one or more other macroblocks, such as the macroblock 511. As a result of the spatial offset, the macroblock 511 may be encoded before the macroblock 510 is encoded.

In some instances, the number of macroblock rows in a picture may exceed the number of processing units 315 encoding the filtered picture in parallel. In an embodiment employing N processing units 315 operating in parallel, for instance, once a row has been fully encoded, a processing unit 315 may advance N macroblock rows in the picture and begin to encode a new row.

Figure 6:
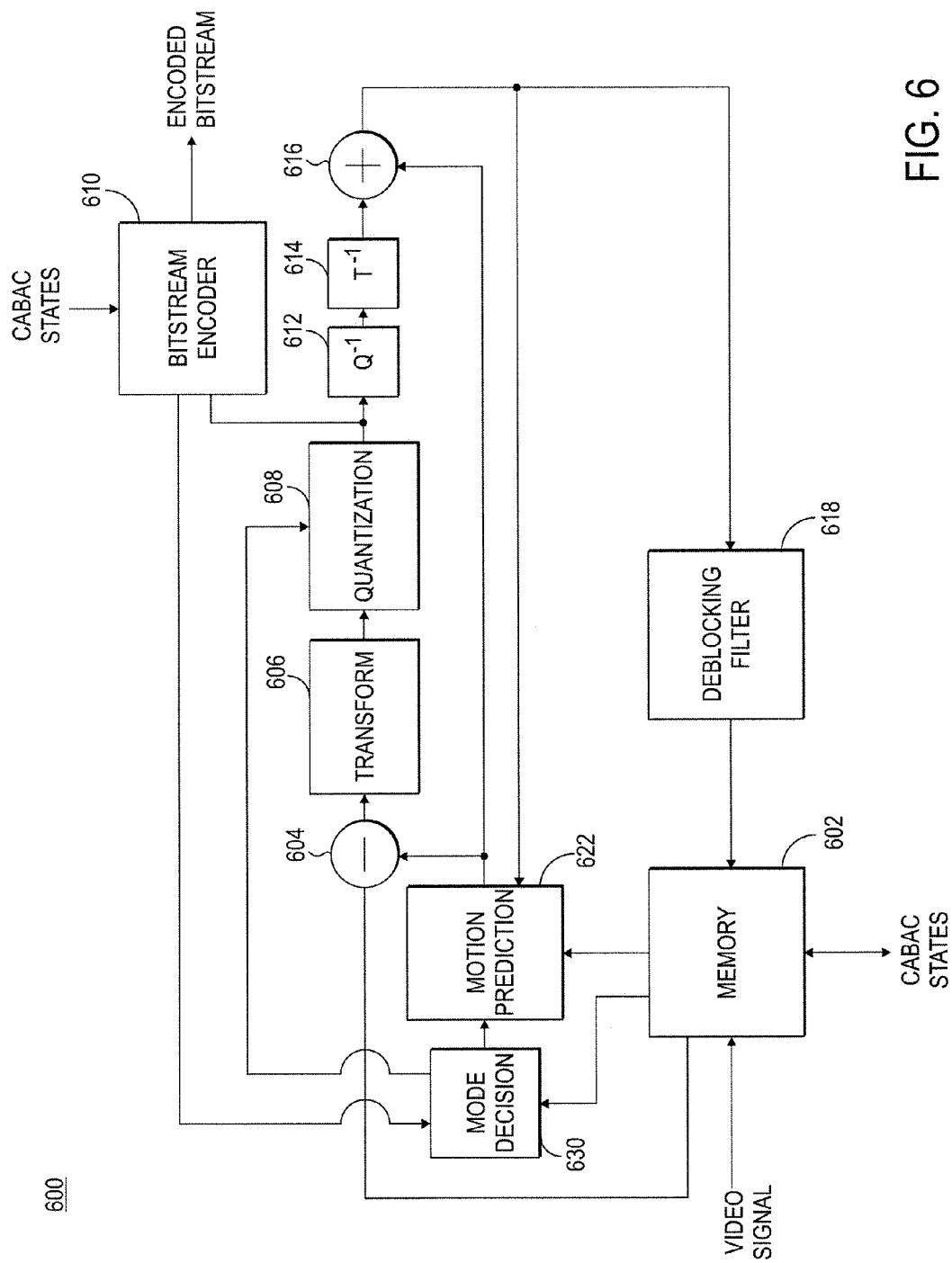
FIG. 6 is a schematic diagram of an encoder according to an embodiment of the present invention.

Problems may arise, however, when encoding the first macroblock of a macroblock row. For example, the first macroblock of a row may depend on the last macroblock of a previous row, and the macroblock of the previous row may not yet be encoded at a time when a processing unit 315 begins to encode the first macroblock of the macroblock row. As will be explained in more detail below, the processing unit 315 may initialize CABAC for encoding the macroblock. CABAC may be initialized, for instance, using one or more stored CABAC states. The stored CABAC state may be a best suitable standard initialization CABAC state (e.g., flat, normal, high activity), a CABAC state provided for the same macroblock during a pre-encode operation, a CABAC state provided for another macroblock during a pre-encode operation or during an RDO encode, and/or a CABAC state for a co-located macroblock of another picture. In this manner, the first macroblock of a row may be encoded prior to encoding all macroblocks on which the first macroblock of the row depends. While this initialization has been described in the context of encoding a first macroblock of a row, in other examples other macroblocks which may not be the first macroblock of a row may be encoded using stored CABAC states FIG. 6 is a schematic block diagram of an encoder 600 according to an embodiment of the invention. The encoder 600 may be implemented using one or more processing elements 315 of FIG. 3. The encoder 600 may further be compliant with one or more coding standards, including the H.264 and HEVC coding standards, and may be configured to operate in accordance with rate-distortion optimization encoding.

While the encoder is described herein as including a memory 602, in some embodiments, the memory 602 may be located outside of the encoder 600. For example, the memory 602 may be used to implement one or more memories described herein, such as the memory 324 of FIG. 3.

The encoder 600 may include a forward encoding path including a mode decision block 630, a motion prediction block 622, a memory 602, a subtractor 604, a transform 606, and a quantization block 608. The encoder may further include a bitstream encoder 610, an inverse quantization block 612, an inverse transform block 614, an adder 616, and a deblocking filter 618. The mode decision block 630 may be configured to determine one or more appropriate coding modes based, at least in part, on the incoming video signal and decoded picture buffer signal, described further below, and/or may determine each coding mode on a per picture and/or macroblock basis. Additionally, the mode decision block 630 may employ motion and/or disparity estimation of the video signal. The mode decision may include macroblock type, intra modes, inter modes, motion vectors, and quantization parameters. In some examples of the present invention, the mode decision block 630 may provide a quantization parameter (e.g., a Lagrangian cost function) that may be used by the quantization block 608. The mode decision block 630 may also utilize the quantization parameter to make mode decisions in accordance with examples of the present invention.

The output of the mode decision block 630 may be utilized by the motion prediction block 622 to generate a predictor in accordance with a coding standard, such as the H.264 coding standard and/or other prediction methodologies. The predictor may be subtracted by a stored (e.g., buffered) version of the video signal at the subtractor 604. Using the stored version of the video signal may provide time for the mode decision block 630 to act. The output of the subtractor 604 may then be the residual, e.g. the difference between a block and a predicted block, and the residual may be provided to the transform 606.

The transform 606 may be configured to perform a transform, such as a discrete cosine transform (DCT), to transform the residual to the frequency domain. As a result, the transform 606 may provide a coefficient block that may, for instance, correspond to spectral components of data in the video signal. The quantization block 608 may be configured to receive the coefficient block and quantize the coefficients of the coefficient block to produce a quantized coefficient block. The quantization employed by the quantization block 608 may be lossy, but may adjust and/or optimize one or more coefficients of the quantized coefficient block based, for instance, on the quantization parameter provided by the mode decision block 630. By way of example, the quantization block 608 may utilize the quantization parameter to optimize or adjust rate-distortion. The quantization parameter may change, e.g. per macroblock or other unit, and may be based on information encoded by the video signal (e.g. video signals encoding advertising may utilize a generally smaller quantization parameter than video signals encoding detailed scenes).

In turn, the bitstream encoder 610 may encode the quantized coefficient block and/or other syntax elements to provide an encoded bitstream. The bitstream encoder 610 may include any entropy encoder known by those having ordinary skill in the art, such as a CABAC entropy encoder. For example, the bitstream encoder 610 may initialize CABAC to encode a first macroblock prior to the encoding of a second macroblock on which encoding of the first macroblock depends. In some examples, the bitstream encoder 610 may be configured to provide a rate for encoding a macroblock. The rate may be provided to the mode decision 630 and/or used to determine a quantization parameter. Rates provided by the bitstream encoder 610 may be based, at least in part, on one or more CABAC states, for instance, provided during pre-encode operations.

The quantized coefficients may also be inverse scaled and inverse quantized by the inverse quantization block 612. The inverse scaled and quantized coefficients may be inverse transformed by the inverse transform block 614 to produce a reconstructed residual. The reconstructed residual may be added to the predictor at the adder 616 to produce reconstructed video, provided to the deblocking filter 618 to employ edge correction, and fed back to the mode decision block 630 for further in-macroblock intra prediction or other mode decision operations.

As discussed, the encoder 600 may operate in accordance with any known video coding standard, including the H.264 video coding standard. Thus, because the H.264 video coding standard employs motion prediction and/or compensation, the encoder 600 may further include a feedback loop that includes an inverse quantization block 612, an inverse transform 614, and a reconstruction adder 616. These elements may mirror elements included in a decoder (not shown) that is configured to reverse, at least in part, the encoding process performed by the encoder 600. Additionally, the feedback loop of the encoder may include a motion prediction block 622, and a deblocking filter 618.

In an example operation of the encoder 600, a video signal (e.g. a base band video signal) may be provided to the encoder 600. The video signal may be provided to the memory 602, and stored therein, and subsequently provided to the mode decision block 630. The subtractor 604 may receive the video signal from the memory 602 and may subtract a motion prediction signal from the video signal to generate a residual signal. The residual signal may be provided to the transform 606 and processed using a forward transform, such as a DCT. As described, the transform 606 may generate a coefficient block that may be provided to the quantization block 608, and the quantization block 608 may quantize and/or optimize the coefficient block. In one embodiment, quantization of the coefficient block may be based, at least in part, on a quantization parameter. As described, the quantization parameter may be based on a rate provided by the bitstream encoder 610. The quantized coefficient block may be provided to the bitstream encoder 610 and the bitstream encoder 610 may encode the quantized coefficient block to provide an encoded bitstream.

The quantized coefficient block may further be provided to the feedback loop of the encoder 600. That is, the quantized coefficient block may be inverse quantized, inverse transformed, and added to the motion prediction signal by the inverse quantization block 612, the inverse transform 614, and the reconstruction adder 616, respectively, to provide a reconstructed video signal. The reconstructed residual may be added to the predictor at the adder 616 to provide reconstructed video, which may be deblocked by the deblocking filter 618, written to the memory 602 for use in future frames, and fed back to the mode decision block 630 and the prediction block 620. Based, at least in part, on the reconstructed video signals, the prediction block 620 may provide a motion prediction signal to the adder 604.

Accordingly, the encoder 600 of FIG. 6 may provide an encoded bitstream based on a video signal, where the coded bitstream is generated using coefficients optimized in accordance with embodiments of the present invention. The encoded bitstream may be a CABAC-encoded bitstream. The encoder may be operated in semiconductor technology, and may be implemented in hardware, software, or combinations thereof.

Figure 7:
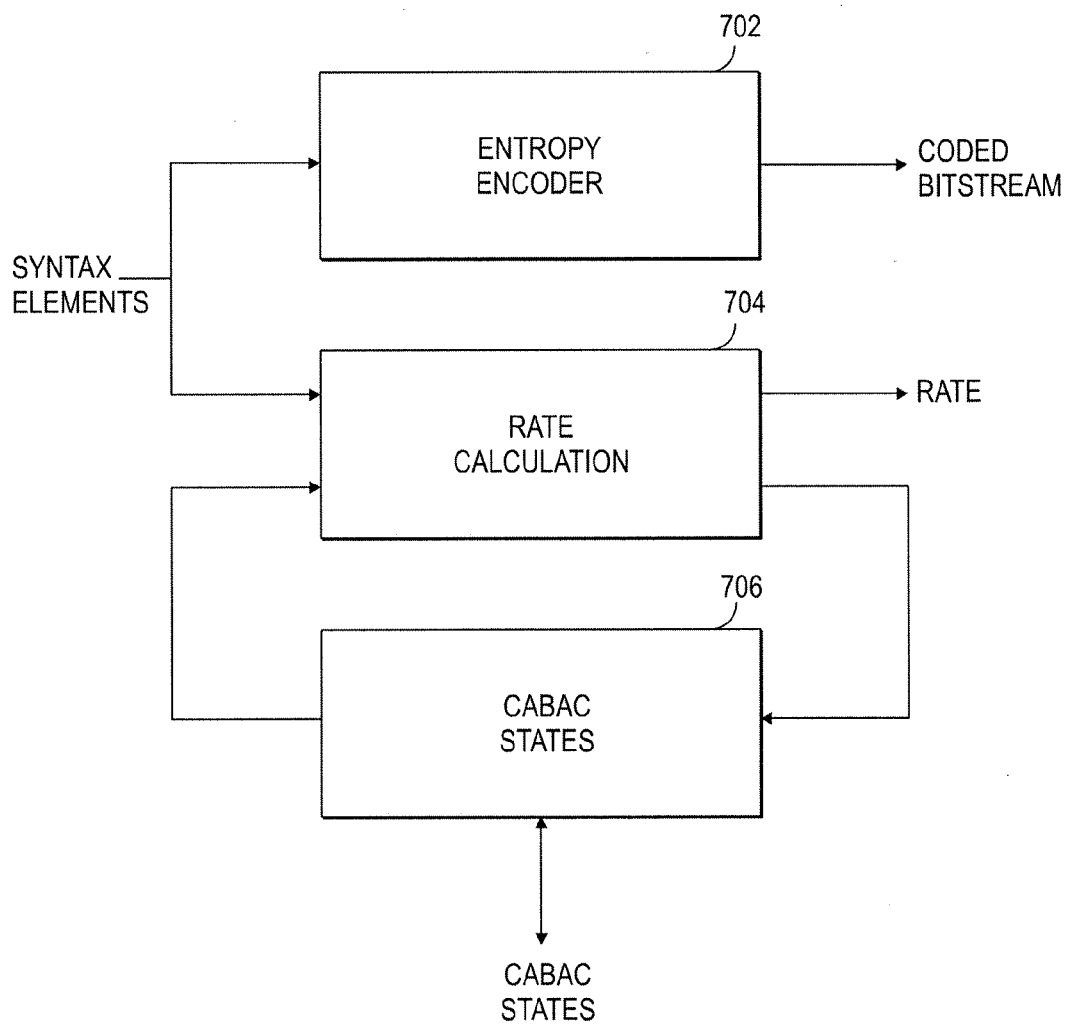
FIG. 7 is a block diagram of an entropy encoder and rate calculation block according to an embodiment of the present invention.

FIG. 7 is a block diagram of bitstream encoder 700 according to an embodiment of the present invention. The bitstream encoder 700 may be used to implement the bitstream encoder 610 of FIG. 6. The bitstream encoder 700 may include an entropy encoder 702, a rate calculation block 704, and a CABAC states block 706.

The entropy encoder 702 may comprise any entropy encoder known in the art, such as a CABAC entropy encoder, and may be configured to receive syntax elements, such as quantized coefficients, and encode the syntax elements to provide an encoded bitstream, as described.

The rate calculation block 704 may also receive the syntax elements and further may receive a CABAC state from the CABAC states block 706. Based, at least in part, on the syntax elements and the CABAC state, the rate calculation block 704 may determine a rate for encoding a macroblock. As described, the rate may be provided to a mode decision block, such as the mode decision block 630, of FIG. 6. The rate calculation block 704 may also update the CABAC state and provide an updated CABAC state to the CABAC states block 706.

The CABAC states block 706 may store the updated CABAC state and further may provide the updated CABAC state to an external memory, such as the memory 324 of FIG. 3 and/or the memory 602 of FIG. 6. In at least one embodiment, the CABAC states block 706 may be configured to provide the updated CABAC state responsive to the encoder 600 encoding a macroblock. In other embodiments, the CABAC states block 706 may be configured to provide the updated CABAC state responsive to the encoder 600 encoding a last macroblock of a macroblock row. In yet another embodiment, the CABAC states block 706 may be configured to provide the updated CABAC state responsive to determining that a next macroblock to be encoded (e.g., by any of the processing units 315) is the first macroblock of a macroblock row.

Moreover, the CABAC states block 706 may further be configured to receive a CABAC state. By way of example, the CABAC states block 706 may be configured to receive a CABAC state prior to the encoder 600 encoding a first macroblock of a row. The received CABAC state may include a CABAC state provided during a pre-encode operation and/or during the encoding of another picture. For example, the CABAC state may be a CABAC state based on a best standard initialization; a CABAC state provided during a field encode, a frame encode, or an adaptive quantization encode; a CABAC state of a macroblock (e.g., co-located macroblock) associated with a previously encoded picture, a CABAC state for the macroblock last encoded by a particular (e.g., same) processing unit 315, a CABAC state of the spatially closest encoded macroblock, a CABAC state based on N encoded macroblocks from a previous row or fragment, or a combination thereof. Received CABAC states may be used, for instance, to initialize CABAC for encoding a macroblock dependent on one or more unencoded macroblocks.

In some embodiments, CABAC states block 706 may receive a plurality of CABAC states. Each of the CABAC states may be used in accordance with RDO encoding to determine which CABAC state is associated with a lowest RD score for a macroblock. The macroblock may subsequently be encoded using the CABAC state associated with the lowest RD score and the CABAC state updated accordingly.

Figure 8:
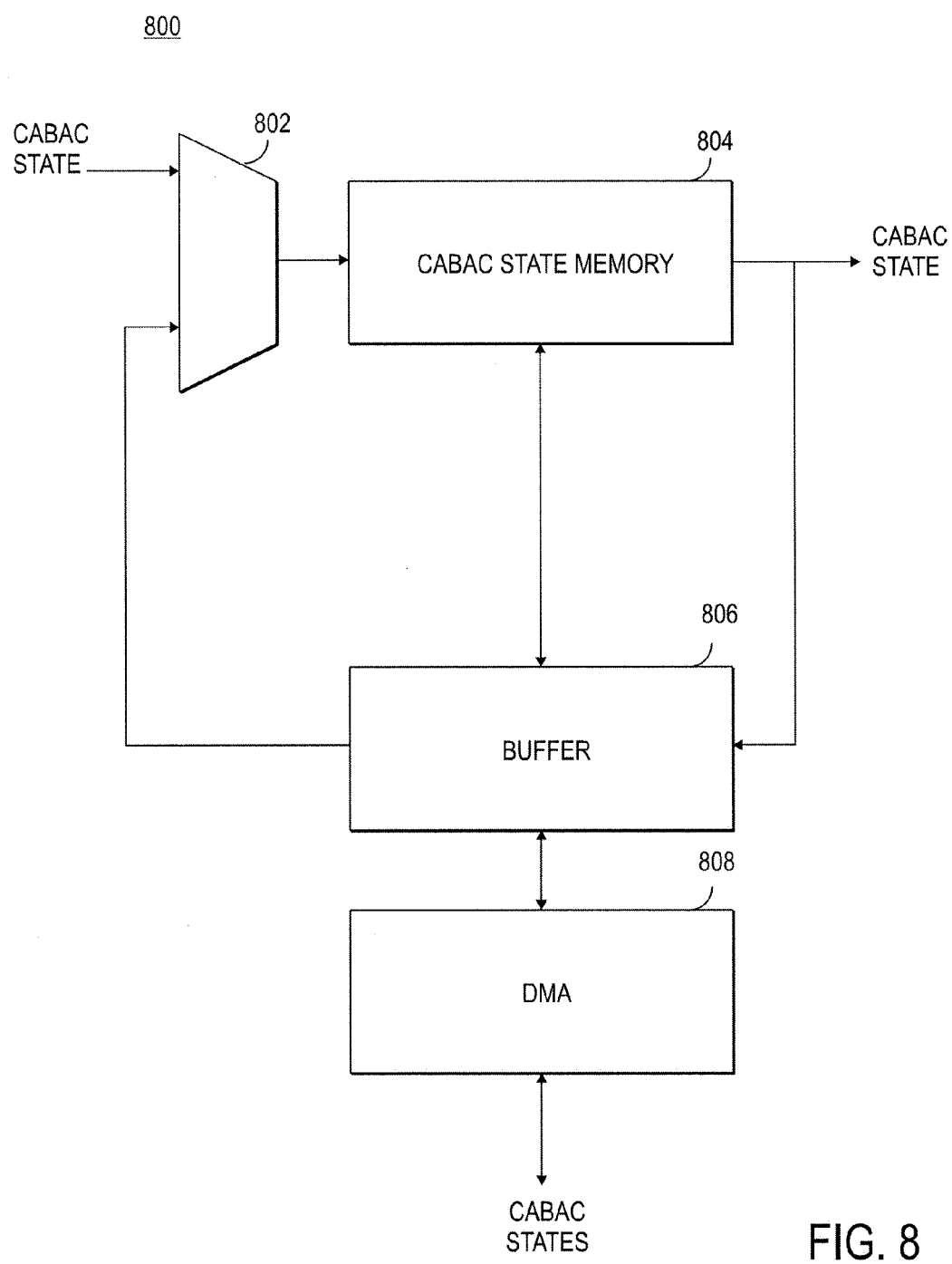
FIG. 8 is a block diagram of a CABAC states block according to an embodiment of the present invention.

FIG. 8 is a block diagram of a CABAC states block 800 according to an embodiment of the present invention. The CABAC states block 800 may be used to implement the CABAC states block 706 of FIG. 7. The CABAC states block 800 may include a multiplexer 802, a CABAC state memory 804, a buffer 806, and a direct memory access (DMA) block 808.

During an encoding process, the multiplexer 802 may receive a CABAC state, for instance, from the rate calculation block 706 of FIG. 7, and provide the CABAC state to the CABAC state memory 804 for storing. The CABAC state memory 804 may provide the CABAC state to the rate calculation block 706, as described, for example, when a stored CABAC state may be needed to initialize CABAC for a macroblock dependent on macroblocks not yet encoded.

The CABAC state memory 804 may further provide the CABAC state to the buffer 806. The buffer 806 may be configured to provide the CABAC state to the DMA circuit 808, and the DMA circuit 808 may provide the stored CABAC state for instance, to the memory 602 of FIG. 6 and/or the memory 324 of FIG. 3, as described above. Similarly, the DMA circuit 808 may receive a CABAC state from an external memory, and provide the CABAC state to the buffer 806. The buffer 806 may subsequently provide the CABAC state to the CABAC state memory 804 via the multiplexer 802 for storing.

CABAC states may be saved in the CABAC states memory 804 and used to initialize CABAC of a macroblock. By initializing CABAC in this manner, a macroblock dependent on one or more unencoded macroblocks may be encoded. For example, in an implementation employing parallel processing with a spatial offset arrangement, a first macroblock of a row may be encoded prior to its previous macroblock (e.g., last macroblock of previous row) being encoded. More generally, in some examples, a processor may begin encoding a macroblock whose encoding depends on the CABAC states of one or more macroblocks which have not yet been encoded. As described, received CABAC states may include one or more of any CABAC states stored previously during an encoding process, including those provided during pre-encode operations and/or during the encoding of another picture.

Figure 11:
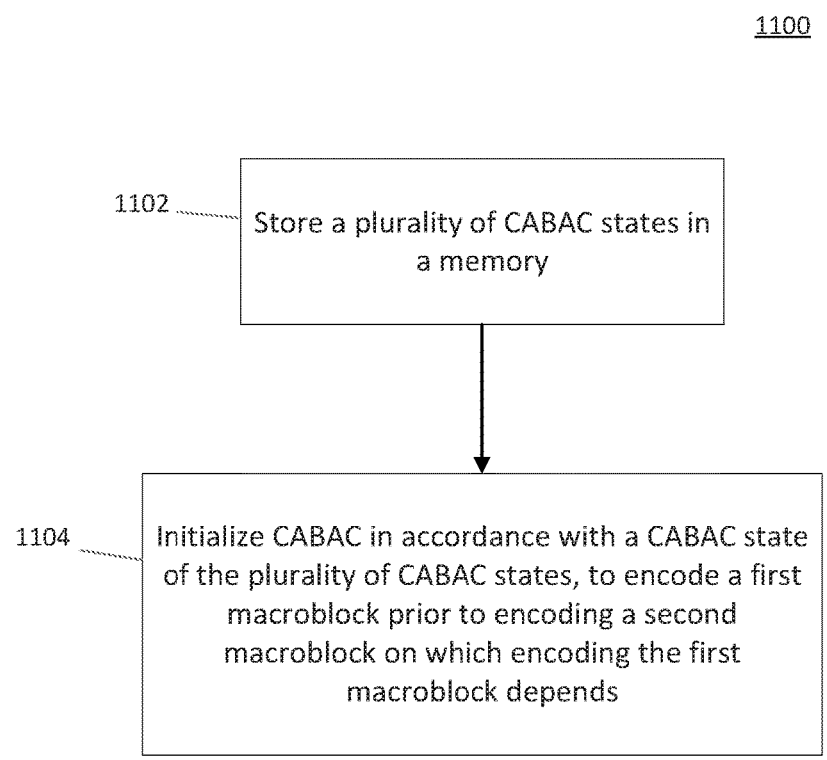
FIG. 11 is a flowchart of a method 1100 for encoding a video signal according to an embodiment of the present invention.

FIG. 11 is a flowchart of a method 1100 for encoding a video signal, according to an embodiment of the present invention. The method may be implemented using the encoder 300 of FIG. 3. At step 1102 a plurality of CABAC states are stored in a memory. At step 1104, CABAC is initialized in accordance with a CABAC state of the plurality of CABAC states, to encode a first macroblock prior to encoding a second macroblock on which encoding of the first macroblock depends.

Figure 9:
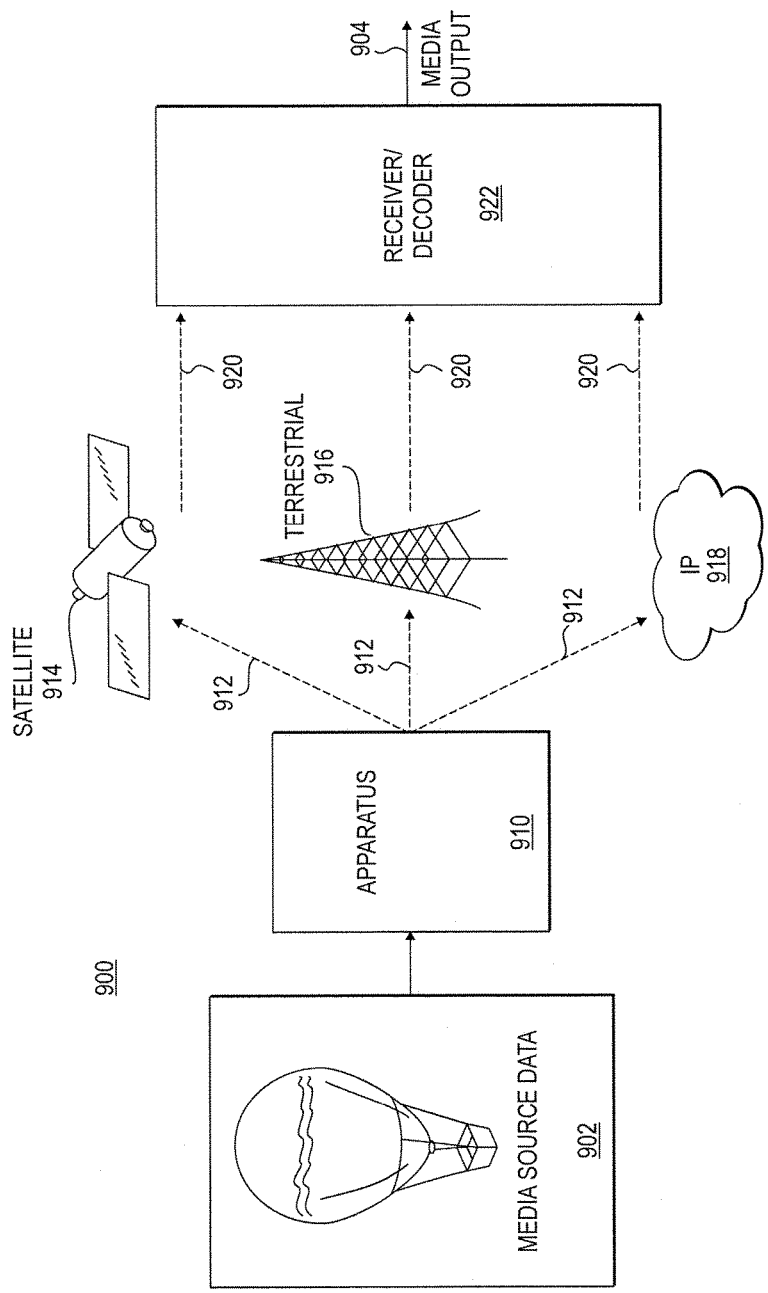
FIG. 9 is a schematic illustration of a media delivery system according to an embodiment of the present invention.

FIG. 9 is a schematic illustration of a media delivery system 900 in accordance with embodiments of the present invention. The media delivery system 900 may provide a mechanism for delivering a media source 902 to one or more of a variety of media output(s) 904. Although only one media source 902 and media output 904 are illustrated in FIG. 9, it is to be understood that any number may be used, and examples of the present invention may be used to broadcast and/or otherwise deliver media content to any number of media outputs.

The media source data 902 may be any source of media content, including but not limited to, video, audio, data, or combinations thereof. The media source data 902 may be, for example, audio and/or video data that may be captured using a camera, microphone, and/or other capturing devices, or may be generated or provided by a processing device. Media source data 902 may be analog and/or digital. When the media source data 902 is analog data, the media source data 902 may be converted to digital data using, for example, an analog-to-digital converter (ADC). Typically, to transmit the media source data 902, some mechanism for compression and/or encryption may be desirable. Accordingly, an apparatus 910 may be provided that may filter and/or encode the media source data 902 using any methodologies in the art, known now or in the future, including encoding methods in accordance with video standards such as, but not limited to, H.264, HEVC, VC-1, VP8 or combinations of these or other encoding standards. The apparatus 910 may be implemented with embodiments of the present invention described herein. For example, the apparatus 910 may be implemented using the apparatus 100 of FIG. 1.

The encoded data 912 may be provided to a communications link, such as a satellite 914, an antenna 916, and/or a network 918. The network 918 may be wired or wireless, and further may communicate using electrical and/or optical transmission. The antenna 916 may be a terrestrial antenna, and may, for example, receive and transmit conventional AM and FM signals, satellite signals, or other signals known in the art. The communications link may broadcast the encoded data 912, and in some examples may alter the encoded data 912 and broadcast the altered encoded data 912 (e.g. by re-encoding, adding to, or subtracting from the encoded data 912). The encoded data 920 provided from the communications link may be received by a receiver 922 that may include or be coupled to a decoder. The decoder may decode the encoded data 920 to provide one or more media outputs, with the media output 904 shown in FIG. 9. The receiver 922 may be included in or in communication with any number of devices, including but not limited to a modem, router, server, set-top box, laptop, desktop, computer, tablet, mobile phone, etc.

The media delivery system 900 of FIG. 9 and/or the apparatus 910 may be utilized in a variety of segments of a content distribution industry.

Figure 10:
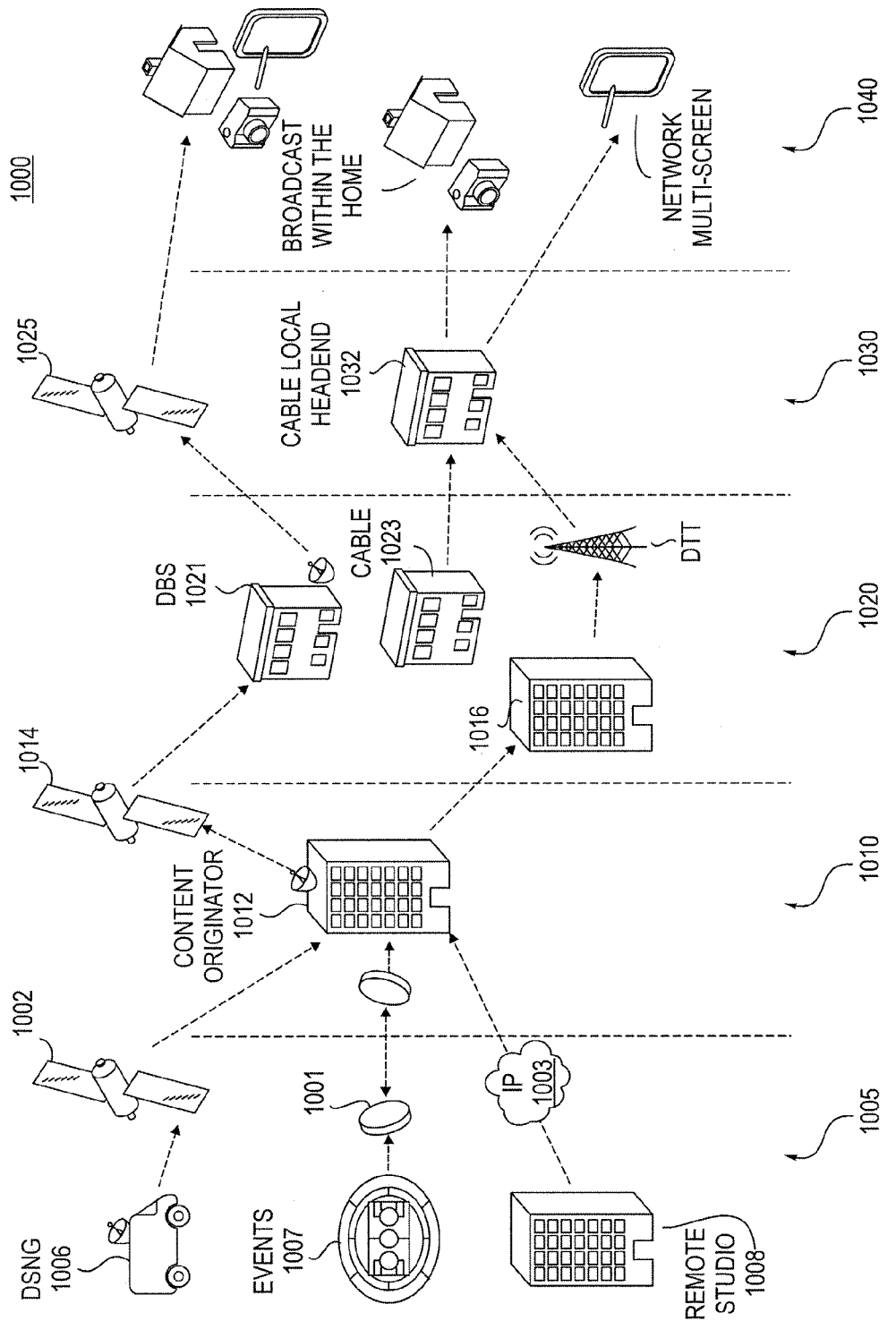
FIG. 10 is a schematic illustration of a video distribution system that may make use of apparatuses described herein.

FIG. 10 is a schematic illustration of a video distribution system 1000 that may make use of apparatuses described herein. The video distribution system 1000 includes video contributors 1005. The video contributors 1005 may include, but are not limited to, digital satellite news gathering systems 1006, event broadcasts 1007, and remote studios 1008. Each or any of these video contributors 1005 may utilize an apparatus described herein, such as the apparatus 100 of FIG. 1, to encode media source data and provide encoded data to a communications link. The digital satellite news gathering system 1006 may provide encoded data to a satellite 1002. The event broadcast 1007 may provide encoded data to an antenna 1001. The remote studio 1008 may provide encoded data over a network 1003.

A production segment 1010 may include a content originator 1012. The content originator 1012 may receive encoded data from any or combinations of the video contributors 1005. The content originator 1012 may make the received content available, and may edit, combine, and/or manipulate any of the received content to make the content available. The content originator 1012 may utilize apparatuses described herein, such as the apparatus 100 of FIG. 1, to provide encoded data to the satellite 1014 (or another communications link). The content originator 1012 may provide encoded data to a digital terrestrial television system 1016 over a network or other communication link. In some examples, the content originator 1012 may utilize a decoder to decode the content received from the contributor(s) 1005. The content originator 1012 may then re-encode data and provide the encoded data to the satellite 1014. In other examples, the content originator 1012 may not decode the received data, and may utilize a transcoder to change a coding format of the received data.

A primary distribution segment 1020 may include a digital broadcast system 1021, the digital terrestrial television system 1016, and/or a cable system 1023. The digital broadcasting system 1021 may include a receiver, such as the receiver 922 described with reference to FIG. 9, to receive encoded data from the satellite 1014. The digital terrestrial television system 1016 may include a receiver, such as the receiver 922 described with reference to FIG. 9, to receive encoded data from the content originator 1012. The cable system 1023 may host its own content which may or may not have been received from the production segment 1010 and/or the contributor segment 1005. For example, the cable system 1023 may provide its own media source data 902 as that which was described with reference to FIG. 9.

The digital broadcast system 1021 may include an apparatus, such as the apparatus 910 described with reference to FIG. 9, to provide encoded data to the satellite 1025. The cable system 1023 may include an apparatus, such as the apparatus 100 of FIG. 1, to provide encoded data over a network or other communications link to a cable local headend 1032. A secondary distribution segment 1030 may include, for example, the satellite 1025 and/or the cable local headend 1032.

The cable local headend 1032 may include an apparatus, such as the apparatus 100 of FIG. 1, to provide encoded data to clients in a client segment 1040 over a network or other communications link. The satellite 1025 may broadcast signals to clients in the client segment 1040. The client segment 1040 may include any number of devices that may include receivers, such as the receiver 922 and associated decoder described with reference to FIG. 9, for decoding content, and ultimately, making content available to users. The client segment 1040 may include devices such as set-top boxes, tablets, computers, servers, laptops, desktops, cell phones, etc.

Accordingly, filtering, encoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus comprising:
a memory configured to buffer a picture of a video signal, the picture comprising a plurality of blocks; and
an encoder configured to (i) receive the picture from the memory, (ii) generate a plurality of initial entropy states of the blocks by an initial encoding of the picture, (iii) store the initial entropy states in the memory, (iv) receive a first unencoded one of the blocks of the picture from the memory, wherein the first unencoded block was dependent on a second unencoded one of the blocks of the picture during the initial encoding, (v) receive the initial entropy states from the memory, (vi) initialize an entropy encoder circuit within the encoder in accordance with a first one of the initial entropy states from the initial encoding that corresponds to the first unencoded block and (vii) generate a portion of a bitstream by a final encoding of the first unencoded block based on the first initial entropy state prior to initializing the entropy encoder circuit to a second one of the initial entropy states to final encode the second unencoded block.

2. The apparatus of claim 1, wherein the encoder is configured to operate in accordance with the H.264 encoding standard, the HEVC coding standard, or a combination thereof.

3. The apparatus of claim 1, wherein the encoder is configured to operate in real-time.

4. The apparatus of claim 1, wherein the entropy encoder circuit is configured to perform a context-adaptive binary arithmetic coding operation.

5. The apparatus of claim 1, wherein the first unencoded block comprises a first block of a row in the picture.

6. The apparatus of claim 1, wherein the encoder is configured to encode a respective row of the picture.

7. The apparatus of claim 6, wherein the encoder is configured to operate in accordance with a spatial offset arrangement.

8. The apparatus of claim 1, wherein the encoder is further configured to receive the initial entropy states from the memory responsive to completion of the initial encoding of a last block of the picture.

9. The apparatus of claim 1, wherein the initial encoding comprises an adaptive quantization encoding.

10. A method for entropy encoding initialization, comprising the steps of:
buffering a picture of a video signal in a memory, the picture comprising a plurality of blocks;
receiving the picture from the memory at an encoder;
generating a plurality of initial entropy states of the blocks by an initial encoding of the picture;
storing the initial entropy states in the memory;
receiving a first unencoded one of the blocks of the picture from the memory, wherein the first unencoded block was dependent on a second unencoded one of the blocks of the picture during the initial encoding;
receiving the initial entropy states from the memory;
initializing an entropy encoder circuit within the encoder in accordance with a first one of the initial entropy states that corresponds to the first unencoded block; and
generating a portion of a bitstream by a final encoding of the first unencoded block based on the first initial entropy state prior to initializing the entropy encoder circuit to a second one of the initial entropy states to final encode the second unencoded block.

11. The method of claim 10, wherein the encoder is configured to operate in accordance with the H.264 encoding standard, the HEVC encoding standard, or a combination thereof.

12. The method of claim 10, wherein the encoder receives the initial entropy states from the memory responsive to completion of the initial encoding of a last block of the picture.

13. The method of claim 10, wherein the initial encoding comprises an adaptive quantization encoding.

14. The method of claim 10, wherein the entropy encoder circuit is configured to perform a context-adaptive binary arithmetic coding operation.

15. The method of claim 10, wherein the first unencoded block comprises a first block of a row in the picture.

16. The apparatus of claim 1, wherein the entropy encoder circuit is further configured to calculate an encoding rate based on a plurality of syntax elements of the blocks and the initial entropy states.

17. The apparatus of claim 16, wherein the entropy encoder circuit is further configured to (i) generate updated entropy states by updating the initial entropy states during the final encoding based on the syntax elements being encoded and (ii) buffer the updated entropy states in an internal memory.

18. The apparatus of claim 17, wherein the entropy encoder circuit is further configured to copy the updated entropy states from the internal memory to the memory.

* * * * *